US012380515B1

(12) United States Patent
Luo et al.

(10) Patent No.: US 12,380,515 B1
(45) Date of Patent: Aug. 5, 2025

(54) METHOD FOR IDENTIFYING OPTIMAL CORRIDOR WIDTH

(71) Applicants: CHENGDU UNIVERSITY OF TECHNOLOGY, Chengdu (CN); Institute of Mountain Hazards and Environment, Chinese Academy of Sciences, Chengdu (CN)

(72) Inventors: Yong Luo, Chengdu (CN); Hui Yu, Chengdu (CN); Dianpeng Chen, Chengdu (CN)

(73) Assignees: CHENGDU UNIVERSITY OF TECHNOLOGY, Chengdu (CN); Institute of Mountain Hazzards and Environment, Chinese Academy of Sciences, Chengdu (CN)

( * ) Notice: Subject to any disclaimer, the term of this patent is extended or adjusted under 35 U.S.C. 154(b) by 0 days.

(21) Appl. No.: 19/000,914

(22) Filed: Dec. 24, 2024

(30) Foreign Application Priority Data

Jul. 25, 2024 (CN) .......................... 202411000419.7

(51) Int. Cl.
G06F 17/16 (2006.01)
G06Q 50/02 (2012.01)

(52) U.S. Cl.
CPC ............ *G06Q 50/02* (2013.01); *G06F 17/16* (2013.01)

(58) Field of Classification Search
CPC ................................ G06Q 50/02; G06F 17/16
See application file for complete search history.

(56) References Cited

U.S. PATENT DOCUMENTS

| 12,139,867 | B1 * | 11/2024 | Cui | ................. | A01C 21/00 |
| 2005/0138867 | A1 * | 6/2005 | Zhao | ................. | A01G 9/14 |
| | | | | | 52/79.1 |

FOREIGN PATENT DOCUMENTS

| CN | 115577825 A | 1/2023 |
| CN | 117974401 A | 5/2024 |

OTHER PUBLICATIONS

Bringezu, "Possible Target Corridor for Sustainable Use of Global Material Resources", 2015, MDPI Publication, pp. 25-54 (Year: 2015).*

(Continued)

*Primary Examiner* — Elias Desta
(74) *Attorney, Agent, or Firm* — Hemisphere Law, PLLC; Zhigang Ma (57) ABSTRACT

A method for identifying an optimal corridor width includes: acquiring geographic information data of a target region; evaluating ecosystem service functions of the target region, and constructing an ecological source land in combination with a nature reserve; constructing a resistance surface indicator system, and obtaining a disaster susceptibility distribution result by using geological disaster distribution point data to correct a resistance surface, to thereby obtain a real resistance surface; importing data of the ecological source land and data of the real resistance surface into LINKAGE MAPPER to generate an ecological corridor; constructing an evaluation system of the optimal corridor width based on three aspects of cost-function-ecological benefits, and evaluating the ecological corridor by using an IEW-TOPSIS model to obtain the optimal corridor width of the ecological corridor. The method can compare and identify the corridor width most suitable for construction, and provide reference base for corridor construction.

9 Claims, 3 Drawing Sheets

(56) References Cited

OTHER PUBLICATIONS

CNIPA, Notification of a First Office Action for CN202411000419.7, Sep. 6, 2024.
Chengdu University of Technology and Institute of Mountain Hazards and Environment, Chinese Academy of Sciences (Applicants), Replacement claims (allowed) of CN202411000419.7, Sep. 13, 2024.
CNIPA, Notification to grant patent right for invention in CN202411000419.7, Nov. 6, 2024.

* cited by examiner

METHOD FOR IDENTIFYING OPTIMAL CORRIDOR WIDTH

TECHNICAL FIELD

The disclosure relates to the field of corridor construction technologies, and more particularly to a method for identifying an optimal corridor width.

BACKGROUND

The cost of a corridor is the biggest factor. In the factors affecting the cost of the corridor, the corridor width plays an important role. The corridor width needs to meet the basic needs of species migration and smooth flow of materials and energy between ecological source lands. Under the background of a linear corridor, the ecological corridor width is an extremely important design variable for animal protection.

SUMMARY

In order to solve the problems existing in the related art, an objective of the disclosure is to provide a method for identifying an optimal corridor width (i.e., a target corridor width, which can comparatively identify the corridor width most suitable for construction and provide a reference for corridor construction.

In order to achieve the above objective, the technical solution adopted by the disclosure is a method for identifying an optimal corridor width, which includes the following steps:

step 1, acquiring geographic information data of a target region;

step 2, evaluating ecosystem service functions of the target region, and at the same time, constructing an ecological source land in combination with nature reserve vector data at the same time;

step 3, constructing a resistance surface indicator system, obtaining a disaster susceptibility distribution result by using geological disaster distribution point data to correct a resistance surface, to thereby obtain a real resistance surface;

step 4, importing data of the ecological source land and data of the real resistance surface into LINKAGE MAPPER to generate an ecological corridor; and step 5, constructing an evaluation system of the target corridor width based on three aspects of cost-function-ecological benefits, and evaluating the ecological corridor by using an information entropy weighting-technique for order preference by similarity to an ideal solution (IEW-TOPSIS) model to obtain a target corridor width of the ecological corridor.

In an exemplary embodiment, the method for identifying the optimal corridor width further includes: constructing an ecological corridor on the target region based on the target corridor width of the ecological corridor. Based on the determination of the target corridor width, the ecological corridor in the west Sichuan Plateau area of Sichuan Province of China is constructed, and the land layout in this area is optimized.

In an embodiment of the disclosure, in the step 1, the geographic information data includes temperature and precipitation data, land use data, vector boundary data, geological disaster distribution point data, elevation data, nature reserve data, vegetation coverage data and human impact index.

In an embodiment of the disclosure, in the step 2, the ecosystem service functions include a biodiversity protection service function, a carbon sequestration service function, a water source conservation service function and a soil conservation service function.

In an embodiment of the disclosure, the step 2 specifically includes:

evaluating the biodiversity protection function by using a habitat quality module of an integrated valuation of ecosystem services and tradeoffs (InVEST) model to evaluate degradation states of habitats in the target region as an indirect embodiment of biodiversity; where a formula for evaluating the degradation states of the habitats in various regions is as follows:

$$Q_{xj} = H_j \left(1 - \left(\frac{D_{xj}^z}{D_{xj}^z + k^z}\right)\right);$$

where $Q_{xj}$ represents habitat quality of a grid x in a land use type j, $H_j$ represents habitat suitability of the land use type j, k and z each represent a constant, and $D_{xj}$ represents a stress level of the grid x in the land use type j;

evaluating the carbon sequestration service function by using a carbon sequestration module in the InVEST model, wherein the carbon sequestration module includes organic matter carbon pools of aboveground living biomass, belowground living biomass, soil and dead, and a total carbon storage is calculated by the following formula:

$$C_{total} = C_{above} + C_{below} + C_{soil} + C_{dead};$$

where $C_{total}$ represents the total carbon storage, $C_{above}$ represents a carbon storage of aboveground living organisms, $C_{below}$ represents a carbon storage of belowground living organisms, $C_{soil}$ represents a carbon storage of soil, and $C_{dead}$ represents a carbon storage of dry branches and fallen leaves;

estimating a water yield of an ecosystem based on a water balance equation as follows:

$$Y_{(xj)} = \left(1 - \frac{AET_{(xj)}}{P_{(x)}}\right) \times P_{(x)};$$

where $Y_{(xj)}$ represents a water yield of the grid x in the land use type j, $AET_{(xj)}$ represents an annual actual evaporation of the grid x in the land use type j, and $P_x$ represents an annual actual precipitation of the grid x; and evaluating the soil conservation service function through a reversed universal soil loss equation (RUSLE) model as follows:

$$SC = R \times K \times L \times S \times (1 - C \times P);$$

where SC represents a soil conservation capacity, and R represents precipitation erosivity; K represents soil erodibility; and L and S each represent a topographic factor, C represents a vegetation factor, and P represents a soil and water conservation measures factor.

In an embodiment of the disclosure, the step 3 specifically includes:

step 3.1, grading a land use factor, an elevation factor, a slope factor and a relief degree factor of land surface, weighting the graded land use factor, the graded elevation factor, the graded slope factor and the graded relief degree factor of land surface, and superimposing the weighted land use factor, the weighted elevation factor, the weighted slope factor and the weighted relief degree factor of land surface to obtain the resistance surface; and step 3.2, the disaster susceptibility distribution result comprising disaster point distribution data and environmental data, importing the disaster point distribution data and the environmental data into a maximum entropy (MaxEnt) model to simulate a disaster risk region, and superimposing the disaster risk region with the resistance surface to obtain a real resistance surface distribution map.

In an embodiment of the disclosure, in the step 3.2, the environmental data include annual precipitation, a normalized difference vegetation index (NDVI), a net primary production (NPP), a slope and a human impact index.

In an embodiment of the disclosure, the step 4 specifically includes: selecting the ecological source land and the real resistance surface to determine an ecological corridor between any two ecological source lands based on a minimum cumulative resistance model.

In an embodiment of the disclosure, in the step 5, cost indicators include a corridor area, a non-green land area in the ecological corridor, a relief degree of land surface, and an accumulated resistance value; functional indicators comprise aggregation degree change, fragmentation degree change and functional degree classification; and ecological benefit indicators comprise a landscape Shannon evenness change index, a total edge contrast index and a contagion index.

In an embodiment of the disclosure, in the step 5, the evaluating the ecological corridor by using an IEW-TOPSIS model to obtain a target corridor width of the ecological corridor specifically includes:

step (1), assuming that there are m evaluated objects and n evaluation indicators of each of the m evaluated objects to construct a determination matrix as follows:

$X=(x_{ij})_{m \times n}(i=1,2,\ldots,m;j=1,2,\ldots,n)$;

step (2), standardizing the determination matrix by the following formula:

$$x'_{ij} = \frac{x_{ij}}{x_{max}};$$

where $x_{max}$ represents a maximum value under a same indicator;

step (3), calculating an information entropy by the following formulas:

$$H_j = -k \sum_{i=1}^{m} p_{ij} \ln p_{ij};$$

$$p_{ij} = \frac{x'_{ij}}{\sum_{i=1}^{m} x'_{ij}};$$

where $$k = \frac{1}{\ln m};$$

step (4), defining a weight of an indicator j by the following formula:

$$\omega_j = \frac{1 - H_j}{\sum_{j=1}^{n}(1 - H_j)};$$

where $\omega_j \in [0,1]$, and $$\sum_{j=1}^{n} \omega_j = 1;$$

step (5), calculating a weighting matrix as follows:

$R=(r_{ij})_{m \times n}, r_{ij}=\omega_j \cdot x_{ij}(i=1,2,\ldots,m;j=1,2,\ldots,n)$;

step (6), determining an optimal solution $S_j^+$ and a worst solution $S_j^-$ by the following formulas:

$S^+=\max(r_{1j},r_{2j}\ldots r_{nj}), S_j^-=\min(r_{1j},r_{2j},\ldots,r_{nj})$;

step (7), calculating a Euclidean distance between each solution and the optimal solution, and a Euclidean distance between each solution and the worst solution by the following formulas:

$$sep_i^+ = \sqrt{\sum_{j=1}^{n}(S_j^+ - r_{ij})^2}, \; sep_i^- = \sqrt{\sum_{j=1}^{n}(S_j^- - r_{ij})^2};$$

step (8), calculating a comprehensive evaluation index by the following formula:

$$C_i = \frac{sep_i^-}{sep_i^+ + sep_i^-}, \; C_i \in [0, 1];$$

where the greater the $C_i$, the better the evaluation object; and step (9), substituting indicator results of different widths into the IEW-TOPSIS model to calculate a most ideal corridor width, to thereby determine the target corridor width. The disclosure has the beneficial effects as follows.

According to the disclosure, the ecological corridor is constructed by fully considering species migration resistance under a complex topography, the corridors with different widths are compared and evaluated from three aspects of cost, function and ecological benefit, and appropriate corridor widths are screened and evaluated, so as to provide decision support for ecological protection and restoration of plateau mountains and provide reference for the construction of ecological corridors in mountainous regions with a complex topography.

DETAILED DESCRIPTION OF EMBODIMENTS

Embodiments of the disclosure will be described in detail in combination with the drawings.

EMBODIMENTS

Figure 1:
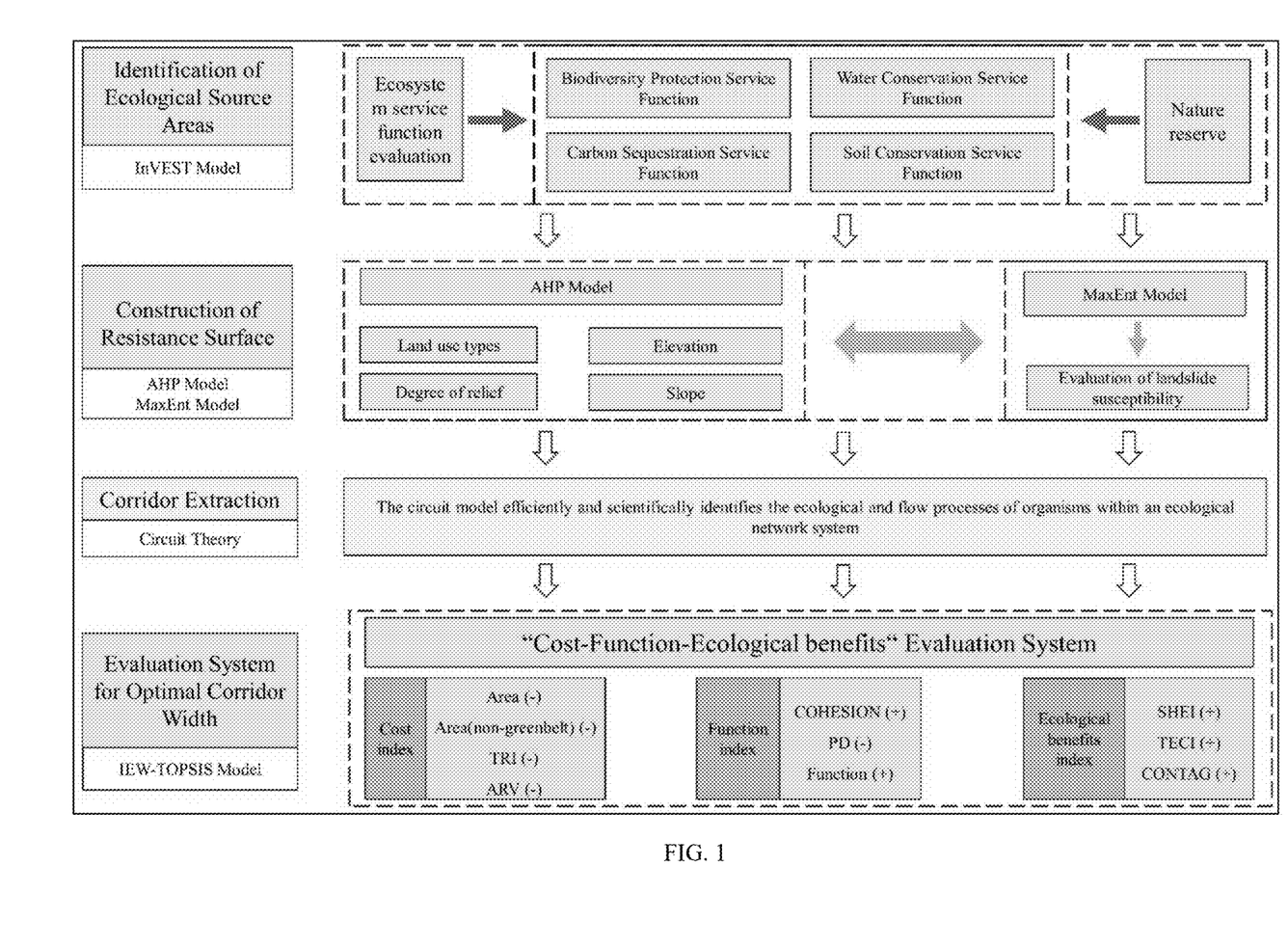
FIG. 1 illustrates a schematic diagram of an overall architecture of a method for identifying an optimal corridor width according to an embodiment of the disclosure.

As shown in FIG. 1, a method for identifying an optimal corridor width includes the following steps 1-5:

In step 1, geographic information data of a target region is acquired. The geographic information data includes temperature and precipitation data, land use data, vector boundary data, geological disaster distribution point data, elevation data, nature reserve vector data, vegetation coverage data and carbon storage data.

In step 2, ecosystem service functions of the target region are evaluated. The ecosystem service functions mainly include a biodiversity protection service function, a carbon sequestration service function, a water source conservation service function and a soil conservation service function. At the same time, an ecological source land is constructed in combination with the nature reserve vector data.

In step 3, a resistance surface indicator system is constructed, and a disaster susceptibility distribution result is obtained by using the geological disaster distribution point data, correct a resistance surface, to thereby obtain a real resistance surface.

In step 4, data of the ecological source land and data of the real resistance surface are imported into LINKAGE MAPPER (which is a geographic information system (GIS) tool for supporting connectivity analysis of regional wildlife habitats) to generate an ecological corridor.

In step 5, an evaluation system of the target ecological corridor width (i.e., an optimal ecological corridor width) is constructed based on three aspects of cost-function-ecological benefits, an IEW-TOPSIS model is used for evaluation, to thereby obtain the target ecological corridor width.

In the evaluation of the biodiversity protection service functions in step 2, a habitat quality part of an InVEST model can evaluate degradation states of habitats in various regions, which may be used as an indirect embodiment of biodiversity. A formula for evaluating the degradation states of the habitats in various regions is as follows:

$$Q_{pq} = H_q\left(1 - \left(\frac{D_{pq}^z}{D_{pq}^z + k^z}\right)\right);$$

where $Q_{pq}$ represents habitat quality of a grid p in a land use type q, and a value range of $Q_{pq}$ is 0-1. The closer the value is to 1, the better the habitat quality. $H_q$ represents habitat suitability of the land use type q, k and z each represent a constant, and $D_{pq}$ represents a stress level of the grid p in the land use type q.

The carbon sequestration service function is evaluated by using a carbon sequestration module in the InVEST model, which mainly includes organic matter carbon pools of aboveground living biomass, belowground living biomass, soil and organic matter. A formula for calculating a total carbon storage is as follows:

$$C_{total} = C_{above} + C_{below} + C_{soil} + C_{dead};$$

where $C_{total}$ represents the total carbon storage (ton per hectare abbreviated as t/hm$^2$), $C_{above}$ represents a carbon storage of the aboveground living organisms (i.e., the aboveground living biomass organic matter carbon pool, t/hm$^2$), $C_{below}$ represents a carbon storage of the belowground living organisms (i.e., the belowground living biomass organic matter carbon pool, t/hm$^2$), $C_{soil}$ represents a carbon storage of the soil (i.e., the soil organic matter carbon pool, t/hm$^2$), and $C_{dead}$ represents a carbon storage of dry branches and fallen leaves (i.e., the dead organic matter carbon pool, t/hm$^2$).

A water yield of an ecosystem is estimated based on a water balance equation, which is as follows:

$$Y_{(pq)} = \left(1 - \frac{AET_{(pq)}}{P_{(p)}}\right) \times P_{(p)};$$

where $Y_{(pq)}$ represents a water yield (millimeter abbreviated as mm) of the grid p of the land use type q, $AET_{(pg)}$ represents an annual actual evaporation (called evapotranspiration, mm) of the grid p of the land use type q, and P (p) represents an annual actual precipitation (mm) of the grid p.

The soil conservation service function is calculated through a RUSLE model as follows:

$$SC = R \times K \times L \times S \times (1 - C \times P);$$

where SC represents a soil conservation capacity (ton per hectare per year abbreviated as t·hm$^{-2}$·yr$^{-1}$), and R represents precipitation erosivity (megajoule per millimeter per hectare per hour per annum abbreviated as MJ·mm/(hm$^2$·h·a)); K represents soil erodibility (ton per hectare per megajoule per millimeter abbreviated as t·hm$^2$/(hm$^2$·MJ·mm); and L and S each represent a topographic factor, C represents a vegetation management factor, and P represents a soil and water conservation measures factor.

In step 3, the constructed resistance surface indicator system mainly includes land use, elevation, slope and a relief degree of land surface. The four factors are respectively graded according to the following table and then weighted and superimposed to obtain the resistance surface.

| Indicator factor | Weight | Classification indicator | Resistance coefficient |
| --- | --- | --- | --- |
| Land use | 0.5 | plowland | 10 |
| | | woodland | 1 |
| | | lawn | 5 |
| | | field | 1 |
| | | wetland | 5 |
| | | water body | 30 |
| | | land for construction | 100 |
| | | Other lands | 90 |
| Elevation (meter abbreviated as m) | 0.1 | <2000 | 10 |
| | | 2000-3000 | 30 |
| | | 3000-4500 | 50 |
| | | 4500-6500 | 70 |
| | | >6500 | 100 |
| Slope (°) | 0.25 | <9 | 10 |
| | | 9-18 | 30 |
| | | 18-27 | 50 |
| | | 27-36 | 70 |
| | | >36 | 100 |
| Relief degree of land surface | 0.15 | <50 | 10 |
| | | 50-100 | 30 |
| | | 100-150 | 50 |
| | | 150-200 | 70 |
| | | >200 | 100 |

A disaster susceptibility distribution result needs not only disaster point distribution data, but also environmental data, which includes annual precipitation, an NDVI, an NPP, a slope and a human impact index. The disaster point distribution data and the environmental data are imported into a MaxEnt model for simulation, to simulate a disaster risk region as much as possible, and the simulated results (i.e., the disaster risk region) are superimposed with the resistance surface to obtain a real resistance surface distribution map.

In step 4, the real resistance surface and the ecological source land are imported into LINKAGE MAPPER, the ecological source land and the resistance surface are selected, and a potential corridor between any two ecological source lands is determined based on a minimum cumulative resistance model.

In step 5, the evaluation system of the optimal corridor width is constructed based on the three aspects of "cost-function-ecological benefits". Main indicators of the evaluation system of the optimal corridor width are shown in the table below. Cost indicators mainly include a corridor area, a non-green land area in the corridor, a relief degree of land surface and an accumulated resistance value. Functional indicators mainly include aggregation degree change, fragmentation degree change and functional degree classification.

Ecological benefit indicators mainly include a landscape Shannon evenness change index, a total edge contrast index and a contagion index.

| | | |
|---|---|---|
| Corridor construction cost | Corridor area (−) | The larger the corridor area, the more contradictions between land use types that need to be coordinated, the greater the possibility of being influenced by humans, and the greater the difficulty of maintaining the continuity of the corridor. |
| | Non-green land area in corridor (−) | These are the direct reasons that hinder corridor construction. The corridors are constructed through road green belts, parks and roof gardens, and non-green lands are eliminated, so that huge costs will be generated. The larger the building area, the greater the building resistance. |
| | Relief degree of land surface (−) | Based on the landform characteristics of alpine canyons in Western Sichuan Plateau, the relief degree of land surface of the horizontal and vertical continuous corridors is taken as one of the costs. |
| | Accumulated resistance value (−) | The resistance value represents the difficulty of species migration, and the greater the value, the more difficult it is for species migration. |
| Corridor function | Aggregation degree change (+) | Landscape aggregation degree (COHESION) reflects the aggregation and dispersion states of patches in the landscape, and the value is between −1 to 1. When the index result is −1, the patches are completely dispersed, when the result is 0, the patches are randomly distributed, and when the result is 1, the patches are aggregated. |
| | Fragmentation degree change (−) | The fragmentation degree represents the segmentation degree of the landscape and reflects the complexity of a landscape spatial structure. The higher the value, the higher the fragmentation degree. |
| | Functional degree classification (+) | The wider the corridor, the more the cost will be, but the functions of the corridor will become richer. |
| Landscape ecological benefit | Landscape Shannon evenness change index (+) | The larger the Shannon's evenness index (SHEI) value, the closer the area ratio of different patch types in the landscape, and the higher the evenness. |
| | Total edge contrast index (+) | The smaller the total edge contrast index (TECI), the higher the landscape stability. |
| | Contagion index (+) | The high contagion value indicates that a certain dominant patch type in the landscape has formed better connectivity; on the contrary, it indicates that the landscape is a dense pattern with many elements, and the fragmentation degree of the landscape is higher. |

The cost indicators are statistical results. In the functional indicators, the functional degree classification is replaced by width. The aggregation degree change is obtained by a software for calculating the landscape indexes, such as a Fragstats software. Firstly, the aggregation degree before corridor construction is obtained by using the Fragstats software, then after corridor construction is simulated, a main simulation method is to transform the identified non-green land part in the corridor region into green lands (such as grassland, woodland and wetland), and the transformed green lands rely on the main green land types in the corridor. Finally, the simulation result is substituted into the Fragstats software to calculate the aggregation degree after the corridor construction. The aggregation degree change before and after corridor construction are compared to obtain the aggregation degree change indicator. The same is true for the fragmentation degree change indicator.

The Fragstats software is also needed for the ecological benefit indicators, and the calculation method is consistent with the calculation method of the aggregation degree change.

Main calculation steps of the IEW-TOPSIS model are as follows:

In step (1), m evaluated objects, and n evaluation indicators of each evaluated object are assumed, to construct a determination matrix as follows;

$X=(x_{ij})_{m \times n}(i=1,2,\ldots,m;j=1,2,\ldots,n)$.

In step (2), the determination matrix is standardized as follows:

$$x'_{ij} = \frac{x_{ij}}{x_{max}};$$

where $x_{max}$ represents a maximum value under a same indicator; $x'_{ij}$ represents the normalized value for each $x_{ij}$.

In step (3), an information entropy is calculated by the following formulas:

$$E_j = -k \sum_{i=1}^{m} p_{ij} \ln p_{ij};$$

$$p_{ij} = \frac{x'_{ij}}{\sum_{i=1}^{m} x'_{ij}};$$

where $$k = \frac{1}{\ln m};$$

$E_j$ represents the information entropy of an evaluation indicator j; $p_{ij}$ represents a weight of a sample value i in the evaluation indicator j.

In step (4), a weight $\omega_j$ of an evaluation indicator j is defined by the following formula:

$$\omega_j = \frac{1-E_j}{\sum_{j=1}^{n}(1-E_j)};$$

where $\omega_j \in [0,1]$, and $$\sum_{j=1}^{n} \omega_j = 1.$$

In step (5), a weighting matrix is calculated by the following formula:

$R=(r_{ij})_{m \times n}, r_{ij}=\omega_j \cdot x_{ij}(i=1,2,\ldots,m;j=1,2,\ldots,n);$ where $r_{ij}$ represents respective scores of different samples for each indicator.

In step (6), an optimal solution $S_j^+$ and a worst solution $S_j^-$ are determined by the following formulas:

$S_j^+=\max(r_{1j},r_{2j},\ldots,r_{nj}), S_j^-=\min(r_{1j},r_{2j},\ldots,r_{nj})$.

In step (7), a Euclidean distance $sep_i^+$ between each solution and the optimal solution, and a Euclidean distance $sep_i^-$ between each solution and the worst solution are calculated by the following formulas:

$$sep_i^+ = \sqrt{\sum_{j=1}^{n}(S_j^+ - r_{ij})^2}, sep_i^- = \sqrt{\sum_{j=1}^{n}(S_j^- - r_{ij})^2}.$$

In step (8), a comprehensive evaluation index $C_i$ is calculated by the following formula:

$$C_i = \frac{sep_i^-}{sep_i^+ + sep_i^-}, C_i \in [0,1];$$

where the greater the $C_i$, the better an evaluation object.

The indicator results of different widths are substituted into the IEW-TOPSIS model to calculate the most ideal corridor width, so as to determine the optimal corridor width (i.e., the target corridor width).

Figure 2:
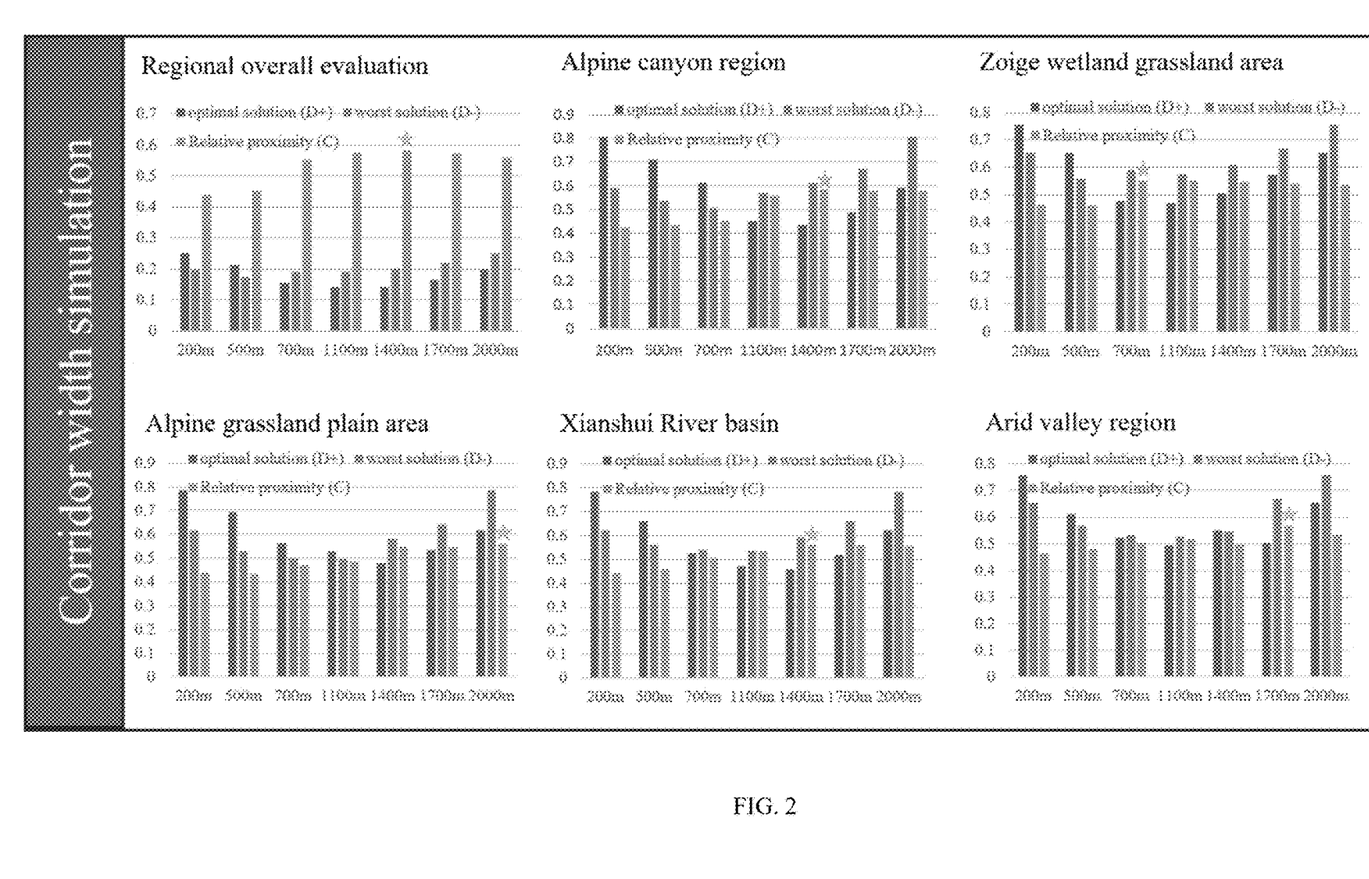
FIG. 2 illustrates a schematic diagram of an evaluation of overall corridors and regional corridors of Western Sichuan Plateau according to an embodiment of the disclosure.

As shown in FIG. 2, the optimal corridor width in Western Sichuan Plateau is evaluated by using the method according to the embodiment.

The IEW-TOPSIS evaluation method is used to evaluate seven types of corridors with different widths (200 m, 500 m, 800 m, 1100 m, 1400 m, 1700 m, and 2000 m), and it is found that the optimal corridor width is 1400 m, followed by the corridor width of 1100 m. The narrowest corridor ranks last, while the widest corridor ranks only fourth. The results show that when the corridor is too narrow, although the cost is greatly reduced, the provided functions and ecological benefits are less, and it is difficult to ensure effectiveness of the corridor. However, the corridor width cannot be widened without restraint due to geometric growth cost after the width increases.

The IEW can not only objectively indicate the importance of a certain indicator in the indicator system during decision making, but also reflect the indicator weight more truly according to a variation coefficient. The index weight results obtained by the IEW can find out the internal factors that determine the corridor width. It is found that the weight of the aggregation degree index is the largest, the corridor function degree classification indicator ranks second and the weight of the corridor area indicator ranks third. It shows that the aggregation degree index shows greater difference, and this indicator can better reflect a value of the corridor. The indexes with top three weights consider the effectiveness and cost of the corridor, and mainly focus on the effectiveness after construction of the corridor, which also has a larger relationship with the smaller built-up region area and high vegetation coverage in Western Sichuan Plateau. Compared with urbanized regions, the cost is much smaller. However, due to large relief degree of land surface of Western Sichuan Plateau, the transportation cost and labor cost are main costs. Ideally, the weight of the relief degree index of land surface ranks fourth, and the relief degree index of land surface plays an important role in the evaluation process, which conforms to the regional characteristics of corridor construction in Western Sichuan Plateau.

Figure 3:
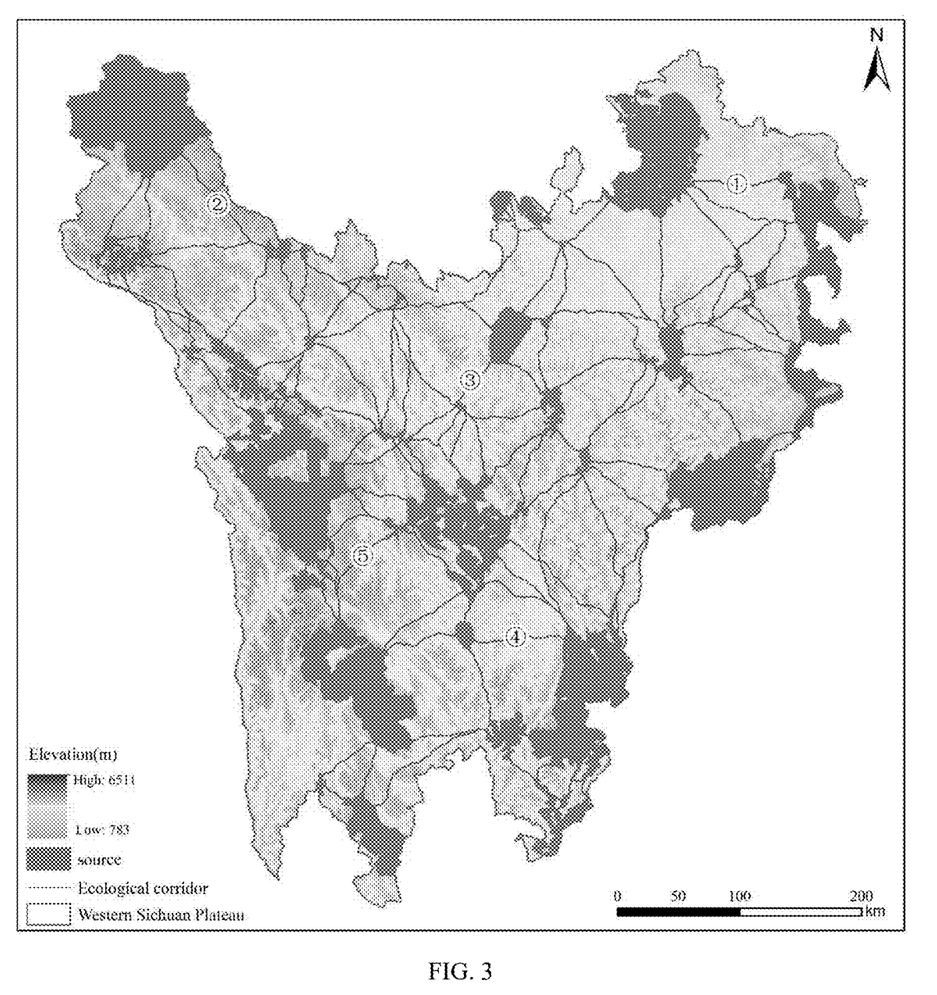
FIG. 3 illustrates a schematic diagram of corridor identification and regional corridor selection in Western Sichuan Plateau according to an embodiment of the disclosure.

The topography and landform of Western Sichuan Plateau are complex. In order to explore whether regional corridor widths are different, five representative potential corridors are selected according to different landform types. As shown in FIG. 3, A corridor 1 is located at a junction of Zoige Wetland Prairie and Giant Panda National Park, with relatively flat topography, abundant precipitation and dense vegetation. A corridor 2 is located in the alpine grassland at high altitude, with an average elevation of more than 4,000 m. The topographic relief in the corridor is not large, but the ecology is relatively sensitive. A corridor 3 belongs to a typical corridor of Xianshui River Basin, with swift rivers. A corridor 4 is located in the dry-hot valley of Yalong River, with obvious seasonal difference between hot and cold, low vegetation coverage and great difficulty in corridor construction. A corridor 5 is located in the alpine canyon region, with large topographic relief and dense vegetation, and cliffs hinder the species migration. Experiments are carried out on the five corridors with obvious differences to study whether the optimal widths of the five corridors are different, which can provide reference for the corridor construction of five different landforms.

The optimal width of the corridor 1 is 800 m, and the most targeted solution is an optimal width only considering the positive impact indicators as 1100 m, which only considers the optimal situation of single indicator, and possibly ignores the negative impact caused by, for example, excessive cost or too small ecological benefits. The most important indicator affecting the corridor evaluation is the non-green land area in the corridor. The corridor passes through a village. When the corridor width is greater than 1400 m, the village is completely covered by the corridor, which makes the corridor cost increase sharply. The optimal width of the corridor 2 is 2000 m, and the width of 1400 m ranks second since the corridor is located on the plateau plain, and the region passed by the corridor is basically covered with grass, and the relief degree of land surface is not large. This makes the construction cost gap not obvious, but the ecological benefits change sharply due to the increase of width. The aggregation degree index has obviously increased. The optimal widths of the corridor 3 and the corridor 5 are both 1400 m, and the affecting indicator with the highest weight is the aggregation degree index. The difference is that the second weight index is changed from the relief degree index of land surface to the landscape Shannon evenness index. The reason is also possibly that the areas of two ecological source lands connected by the corridor 3 are smaller, while the corridor 5 connects the Xianshuihe Grand Canyon National Forest Park and Haizishan National Nature Reserve in Sichuan, and the ecological benefits are more obvious. The optimal width of the corridor 4 is 1700 m, and the most influential indicator is the non-green land area in the corridor 4. This seems to be a contradiction, but by comparing remote sensing images of the corridor 4, most of the non-green lands are bare land. Although the increase in cost cannot be ignored, the improvement of large-scale bare land strengthens the connection with surrounding green lands, and the ecological benefits are significantly improved.

In the embodiment, 157 corridors with a total length of 7807.28 kilometers (km) are extracted in combination with unique landform features of Western Sichuan Plateau through a disaster susceptibility correction factor. Seven widths of corridors are evaluated from three aspects of cost, function and ecological benefit, to thereby explore the optimal corridor width in Western Sichuan Plateau. The results show that the overall optimal width of ecological corridor construction in Western Sichuan Plateau is 1400 m, but there are some local differences, as shown in FIG. 2. In the process of evaluating the width of a single corridor, the optimal width has appeared from 800 m, 1400 m, 1700 m and 2000 m. This also shows that the corridor width is extremely sensitive to regional characteristics.

The embodiment highlights the difference in importance of the same corridor under different widths in the exploration of identifying the ecological corridor width. The results show that the selection of the ecological corridor width can be supported by comparing importance difference levels of a single corridor in combination with ecological function requirements.

The above embodiments merely express the specific embodiments of the disclosure, and descriptions thereof are more specific and detailed, but they cannot be understood as limiting the patent scope of the disclosure. It should be pointed out that for those skilled in the art, without departing from the concept of the disclosure, several variations and improvements may also be made and are within the scope of protection of the disclosure.

What is claimed is:

1. A method for identifying a target corridor width, comprising:

step 1, acquiring geographic information data of a target region;

step 2, evaluating ecosystem service functions of the target region, and constructing an ecological source land in combination with nature reserve vector data at the same time;

step 3, constructing a resistance surface indicator system, obtaining a disaster susceptibility distribution result by using geological disaster distribution point data to correct a resistance surface, to thereby obtain a real resistance surface;

step 4, importing data of the ecological source land and data of the real resistance surface into LINKAGE MAPPER to generate an ecological corridor;

step 5, constructing an evaluation system of the target corridor width based on three aspects of cost-function-ecological benefits, and evaluating the ecological corridor by using an information entropy weighting-technique for order preference by similarity to an ideal solution (IEW-TOPSIS) model to obtain a target corridor width of the ecological corridor; and step 6, constructing the ecological corridor on the target region based on the target corridor width of the ecological corridor, to thereby optimize a land layout in the target region;

wherein in the step 5, the evaluating the ecological corridor by using an IEW-TOPSIS model to obtain a target corridor width of the ecological corridor specifically comprises:

step (1), assuming that there are m evaluated objects and n evaluation indicators of each of the m evaluated objects to construct a determination matrix as follows:

$X=(x_{ij})_{m \times n}$;

wherein i=1, 2, . . . , m; j=1, 2, . . . , n;c step (2), standardizing the determination matrix by the following formula:

$$x'_{ij} = \frac{x_{ij}}{x_{max}};$$

wherein $x_{max}$ represents a maximum value under a same indicator;

step (3), calculating an information entropy by the following formulas:

$$H_j = -k \sum_{i=1}^{m} p_{ij} \ln p_{ij};$$

$$p_{ij} = \frac{x'_{ij}}{\sum_{i=1}^{m} x'_{ij}},$$

wherein $$k = \frac{1}{\ln m};$$

step (4), defining a weight of an evaluation indicator j by the following formula:

$$\omega_j = \frac{1 - H_j}{\sum_{j=1}^{n}(1 - H_j)};$$

wherein $\omega_j \in [0,1]$, and $$\sum_{j=1}^{n} \omega_j = 1;$$

step (5), calculating a weighting matrix as follows:

$$R=(r_{ij})_{m \times n}, r_{ij}=\omega_j \cdot x_{ij};$$

wherein i=1, 2, . . . , m; j=1, 2, . . . , n;

step (6), determining an optimal solution $S_j^+$ and a worst solution Si by the following formulas:

$$S_j^+=\max(r_{ij},r_{2j}, \ldots ,r_{nj}), S_j^-=\min(r_{ij},r_{2j}, \ldots ,r_{nj});$$

step (7), calculating a Euclidean distance between each solution and the optimal solution, and a Euclidean distance between each solution and the worst solution by the following formulas:

$$sep_i^+ = \sqrt{\sum_{j=1}^{n}(S_j^+ - r_{ij})^2}, sep_i^- = \sqrt{\sum_{j=1}^{n}(S_j^- - r_{ij})^2};$$

step (8), calculating a comprehensive evaluation index by the following formula:

$$C_i = \frac{sep_i^-}{sep_i^+ + sep_i^-}, C_i \in [0, 1];$$

wherein the greater the $C_i$, the better the evaluation object; and substituting indicator results of different widths into the IEW-TOPSIS model to calculate a most ideal corridor width, to thereby determine the target corridor width.

2. The method for identifying the target corridor width according to claim 1, wherein in the step 1, the geographic information data comprises temperature and precipitation data, land use data, vector boundary data, geological disaster distribution point data, elevation data, nature reserve vector data, vegetation coverage data and human impact index.

3. The method for identifying the target corridor width according to claim 1, wherein in the step 2, the ecosystem service functions comprise a biodiversity protection service function, a carbon sequestration service function, a water source conservation service function and a soil conservation service function.

4. The method for identifying the target corridor width according to claim 3, wherein the step 2 specifically comprises:

evaluating the biodiversity protection service function by using a habitat quality module of an integrated valuation of ecosystem services and tradeoffs (InVEST) model to evaluate degradation states of habitats in the target region as an indirect embodiment of biodiversity; wherein a formula for evaluating the degradation states of the habitats in various regions is as follows:

$$Q_{xj} = H_j\left(1 - \left(\frac{D_{xj}^z}{D_{xj}^z + k^z}\right)\right);$$

wherein $Q_{xj}$ represents habitat quality of a grid x in a land use type j, $H_j$ represents habitat suitability of the land use type j, k and z each represent a constant, and $D_{xj}^z$ represents a stress level of the grid x in the land use type j;

evaluating the carbon sequestration service function by using a carbon sequestration module in the InVEST model; wherein the carbon sequestration module includes organic matter carbon pools of aboveground living biomass, belowground living biomass, soil and dead:

$$C_{total}=C_{above}+C_{below}+C_{soil}+C_{dead};$$

wherein $C_{total}$ represents a total carbon storage, $C_{above}$ represents a carbon storage of aboveground living organisms, $C_{below}$ represents a carbon storage of belowground living organisms, $C_{soul}$ represents a carbon storage of soil, and $C_{dead}$ represents a carbon storage of dry branches and fallen leaves;

estimating a water yield of an ecosystem based on a water balance equation as follows:

$$Y_{(xj)} = \left(1 - \frac{AET_{(xj)}}{P_{(x)}}\right) \times P_{(x)};$$

wherein $Y_{(xj)}$ represents a water yield of the grid x in the land use type j, $AET_{(xj)}$ represents an annual actual evaporation of the grid x in the land use type j, and $P_x$ represents an annual actual precipitation of the grid x; and evaluating the soil conservation service function through a reversed universal soil loss equation (RUSLE) model as follows:

$$SC=R \times K \times L \ x \ S \times (1-C \times P);$$

wherein SC represents a soil conservation capacity, and R represents precipitation erosivity; K represents soil erodibility; and L and S each represent a topographic factor, C represents a vegetation factor, and P represents a soil and water conservation measures factor.

5. The method for identifying the target corridor width according to claim 1, wherein the step 3 specifically comprises:

step 3.1, grading a land use factor, an elevation factor, a slope factor and a relief degree factor of land surface, weighting the graded land use factor, the graded elevation factor, the graded slope factor and the graded relief degree factor of land surface, and superimposing the weighted land use factor, the weighted elevation factor, the weighted slope factor and the weighted relief degree factor of land surface to obtain the resistance surface; and step 3.2, the disaster susceptibility distribution result comprising disaster point distribution data and environmental data, importing the disaster point distribution data and the environmental data into a maximum entropy (MaxEnt) model to simulate a disaster risk region, and superimposing the disaster risk region with the resistance surface to obtain a real resistance surface distribution map.

6. The method for identifying the target corridor width according to claim 5, wherein in the step 3.2, the environmental data comprises annual precipitation, a normalized difference vegetation index (NDVI), a net primary production (NPP), a slope and a human impact index.

7. The method for identifying the target corridor width according to claim 5, wherein the step 4 specifically comprises: selecting the ecological source land and the real resistance surface to determine an ecological corridor between any two ecological source lands based on a minimum cumulative resistance model.

8. The method for identifying the target corridor width according to claim 1, wherein in the step 5, cost indicators comprise a corridor area, a non-green land area in the ecological corridor, a relief degree of land surface, and an accumulated resistance value; functional indicators comprise aggregation degree change, fragmentation degree change and functional degree classification; and
ecological benefit indicators comprise a landscape Shannon evenness change index, a total edge contrast index and a contagion index.

9. A method for identifying a target corridor width, comprising:
step 1, acquiring geographic information data of a target region;
step 2, evaluating ecosystem service functions of the target region, and constructing an ecological source land in combination with nature reserve vector data at the same time;
step 3, constructing a resistance surface indicator system, obtaining a disaster susceptibility distribution result by using geological disaster distribution point data to correct a resistance surface, to thereby obtain a real resistance surface, comprising:
grading a land use factor, an elevation factor, a slope factor and a relief degree factor of land surface, weighting the graded land use factor, the graded elevation factor, the graded slope factor and the graded relief degree factor of land surface, and superimposing the weighted land use factor, the weighted elevation factor, the weighted slope factor and the weighted relief degree factor of land surface to obtain the resistance surface; and
the disaster susceptibility distribution result comprising disaster point distribution data and environmental data, importing the disaster point distribution data and the environmental data into a maximum entropy (MaxEnt) model to simulate a disaster risk region, and superimposing the disaster risk region with the resistance surface to obtain a real resistance surface distribution map;
step 4, importing data of the ecological source land and data of the real resistance surface into a geographic information system (GIS) tool to generate an ecological corridor;

step 5, constructing an evaluation system of the target corridor width based on three aspects of cost-function-ecological benefits, wherein cost indicators comprise a corridor area, a non-green land area in the ecological corridor, a relief degree of land surface, and an accumulated resistance value; functional indicators comprise aggregation degree change, fragmentation degree change and functional degree classification; and ecological benefit indicators comprise a landscape Shannon evenness change index, a total edge contrast index and a contagion index, and evaluating the ecological corridor by using an information entropy weighting-technique for order preference by similarity to an ideal solution (IEW-TOPSIS) model to obtain a target corridor width of the ecological corridor, comprising:
assuming that there are m evaluated objects and n evaluation indicators of each of the m evaluated objects to construct a determination matrix as follows:

$$X=(x_{ij})_{m \times n};$$

wherein i=1, 2, . . . , m; j=1, 2, . . . , n;c standardizing the determination matrix by the following formula:

$$x'_{ij} = \frac{x_{ij}}{x_{max}};$$

wherein $x_{max}$ represents a maximum value under a same indicator;
calculating an information entropy by the following formulas:

$$H_j = -k \sum_{i=1}^{m} p_{ij} \ln p_{ij};$$

$$p_{ij} = \frac{x'_{ij}}{\sum_{i=1}^{m} x'_{ij}};$$

wherein $$k = \frac{1}{\ln m};$$

defining a weight of an evaluation indicator j by the following formula:

$$\omega_j = \frac{1 - H_j}{\sum_{j=1}^{n} (1 - H_j)};$$

wherein $\omega_j \in [0,1]$, and $$\sum_{j=1}^{n} \omega_j = 1;$$

calculating a weighting matrix as follows:

$$R=(r_{ij})_{m \times n}, r_{ij}=\omega_j \cdot x_{ij};$$

wherein i=1, 2, . . . , m; j=1, 2, . . . , n;

determining an optimal solution S' and a worst solution Si by the following formulas:

$$s_j^+ = \max(r_{1j}, r_{2j}, \ldots, r_{nj}), S_j^- = \min(r_{1j}, r_{2j}, \ldots, r_{nj});$$

calculating a Euclidean distance between each solution and the optimal solution, and a Euclidean distance between each solution and the worst solution by the following formulas:

$$sep_i^+ = \sqrt{\sum_{j=1}^n (S_j^+ - r_{ij})^2}, \; sep_i^- = \sqrt{\sum_{j=1}^n (S_j^- - r_{ij})^2};$$

calculating a comprehensive evaluation index by the following formula:

$$C_i = \frac{sep_i^-}{sep_i^+ + sep_i^-}, \; C_i \in [0, 1];$$

wherein the greater the $C_i$, the better the evaluation object; and substituting indicator results of different widths into the IEW-TOPSIS model to calculate a most ideal corridor width, to thereby determine the target corridor width; and step 6, constructing, based on the target corridor width, a target ecological corridor with the target corridor width on the target region, to thereby optimize a land layout in the target region and achieve ecological protection and restoration of the target region.

* * * * *